(12) United States Patent
Niu et al.

(10) Patent No.: US 8,917,208 B2
(45) Date of Patent: *Dec. 23, 2014

(54) SYSTEM AND METHOD FOR EFFICIENT TRANSMIT AND RECEIVE BEAMFORMING PROTOCOL WITH HETEROGENEOUS ANTENNA CONFIGURATION

(75) Inventors: Huaning Niu, Sunnyvale, CA (US); Pengfei Xia, Mountain View, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,326

(22) Filed: Jun. 6, 2011

(65) Prior Publication Data

US 2011/0237196 A1 Sep. 29, 2011

Related U.S. Application Data

(63) Continuation of application No. 12/189,747, filed on Aug. 11, 2008, now Pat. No. 7,978,134.

(60) Provisional application No. 60/955,613, filed on Aug. 13, 2007.

(51) Int. Cl.
| | |
|---|---|
| *H01Q 3/00* | (2006.01) |
| *H04B 7/00* | (2006.01) |
| *H01Q 3/26* | (2006.01) |
| *H04B 7/06* | (2006.01) |
| *H04B 7/04* | (2006.01) |

(52) U.S. Cl.
CPC .............. *H01Q 3/2605* (2013.01); *H04B 7/043* (2013.01); *H01Q 3/26* (2013.01); *H04B 7/0691* (2013.01)
USPC ........... 342/368; 342/359; 342/360; 342/367; 342/371; 342/372; 342/374; 342/377; 370/329; 455/507; 706/24

(58) Field of Classification Search
CPC ......... H01Q 3/00; H01Q 3/26; H01Q 3/2605; H01Q 3/2652; H01Q 3/28; H04B 7/043; H04B 7/0456; H04B 7/0478; H04B 7/0482
USPC ......... 342/360, 359, 367–368, 374, 371, 372, 342/377; 455/507; 370/329; 706/24
See application file for complete search history.

(56) References Cited

U.S. PATENT DOCUMENTS

| 4,696,053 A | * | 9/1987 | Mastriani et al. .......... 455/67.16 |
| 5,955,991 A | * | 9/1999 | Kawakubo ................... 342/374 |

(Continued)

FOREIGN PATENT DOCUMENTS

| EP | 1267501 A2 | 12/2002 |
| JP | 2004140642 A | 5/2004 |

(Continued)

OTHER PUBLICATIONS

Ernst Boneck, "Switched-Beam Adaptive Antenna System", Nov. 1999.*

(Continued)

*Primary Examiner* — Jack W Keith
*Assistant Examiner* — Chuong P Nguyen
(74) *Attorney, Agent, or Firm* — Kenneth L. Sherman, Esq.; Michael Zarrabian, Esq.; Sherman & Zarrabian LLP

(57) ABSTRACT

A system and method of training antennas for two devices having heterogeneous antenna configurations in a wireless network is disclosed. The method includes communicating one or more estimation training sequences between two devices via a phased array antenna and a switched array antenna, wherein a beamforming vector of the phased array antenna is switched between phase vectors within a set of weight vectors while the switched array antenna is switched within a plurality of antenna sectors. The method further includes tuning at least one of the phase array and switched array antennas with an antenna parameter selected based at least in part on the one or more estimation training sequences. The method further includes communicating data messages via at least one of the phase array and switched array antennas so tuned.

47 Claims, 7 Drawing Sheets

(56) References Cited

U.S. PATENT DOCUMENTS

| | | | |
|---|---|---|---|
| 6,009,124 A | 12/1999 | Smith et al. | |
| 6,570,864 B1 | 5/2003 | Kim et al. | |
| 6,590,532 B1 | 7/2003 | Ogawa et al. | |
| 6,639,551 B2 | 10/2003 | Li et al. | |
| 6,671,265 B1 | 12/2003 | Hwang et al. | |
| 6,677,898 B2 | 1/2004 | Cheng et al. | |
| 6,701,165 B1 | 3/2004 | Ho et al. | |
| 6,721,908 B1 | 4/2004 | Kim et al. | |
| 6,731,689 B2 | 5/2004 | Dogan | |
| 6,795,392 B1 | 9/2004 | Li et al. | |
| 6,832,080 B1 | 12/2004 | Arslan et al. | |
| 6,847,832 B2 | 1/2005 | Wong et al. | |
| 6,925,131 B2 | 8/2005 | Balakrishnan et al. | |
| 6,937,189 B2 | 8/2005 | Kim | |
| 6,959,047 B1 | 10/2005 | Al-Dhahir et al. | |
| 6,982,968 B1 | 1/2006 | Barratt et al. | |
| 6,985,466 B1 | 1/2006 | Yun et al. | |
| 7,009,559 B2 | 3/2006 | Regnier et al. | |
| 7,013,165 B2 | 3/2006 | Yoon et al. | |
| 7,039,370 B2 | 5/2006 | Laroia et al. | |
| 7,065,149 B2 | 6/2006 | Ghavami et al. | |
| 7,096,041 B2 | 8/2006 | Brunner et al. | |
| 7,099,630 B2 | 8/2006 | Brunner et al. | |
| 7,099,678 B2 | 8/2006 | Vaidyanathan | |
| 7,103,383 B2 | 9/2006 | Ito | |
| 7,148,845 B2 | 12/2006 | Van Rooyen et al. | |
| 7,161,534 B2 | 1/2007 | Tsai et al. | |
| 7,194,237 B2 | 3/2007 | Sugar et al. | |
| 7,236,759 B2 | 6/2007 | Cha et al. | |
| 7,239,893 B2 | 7/2007 | Yang | |
| 7,245,880 B1 | 7/2007 | Jacobsen | |
| 7,312,750 B2 | 12/2007 | Mao et al. | |
| 7,342,535 B2 | 3/2008 | Ann et al. | |
| 7,411,547 B2 | 8/2008 | Van Rooyen et al. | |
| 7,446,698 B2 | 11/2008 | Bast | |
| 7,450,659 B2 | 11/2008 | Corredoura et al. | |
| 7,480,497 B2 | 1/2009 | Biswas et al. | |
| 7,539,458 B2 | 5/2009 | Jafarkhani et al. | |
| 7,542,486 B2 | 6/2009 | Cattaneo | |
| 7,547,778 B2 | 6/2009 | Balducci et al. | |
| 7,583,982 B2 | 9/2009 | Olesen et al. | |
| 7,587,173 B2 | 9/2009 | Hoffmann et al. | |
| 7,605,755 B2 | 10/2009 | Van Rooyen et al. | |
| 7,609,648 B2 | 10/2009 | Hoffmann et al. | |
| 7,627,051 B2 | 12/2009 | Shen et al. | |
| 7,657,244 B2 | 2/2010 | Niu et al. | |
| 7,668,255 B1 | 2/2010 | Al-Dhahir et al. | |
| 7,680,517 B2* | 3/2010 | Uno et al. | 455/562.1 |
| 7,697,602 B2 | 4/2010 | Frey et al. | |
| 7,702,028 B2 | 4/2010 | Zhou et al. | |
| 7,710,319 B2 | 5/2010 | Nassiri-Toussi et al. | |
| 7,710,925 B2 | 5/2010 | Poon | |
| 7,711,330 B2 | 5/2010 | Yang et al. | |
| 7,714,781 B2 | 5/2010 | Xia et al. | |
| 7,714,783 B2 | 5/2010 | Niu et al. | |
| 7,761,059 B2 | 7/2010 | Lau | |
| 7,801,238 B2 | 9/2010 | Borst et al. | |
| 7,826,559 B2 | 11/2010 | Al-Dhahir et al. | |
| 7,839,819 B2 | 11/2010 | Kim | |
| 7,847,732 B1* | 12/2010 | Nabar et al. | 342/373 |
| 7,881,396 B2 | 2/2011 | Zhou et al. | |
| 7,898,478 B2 | 3/2011 | Niu et al. | |
| 7,916,081 B2 | 3/2011 | Lakkis | |
| 7,978,134 B2* | 7/2011 | Niu et al. | 342/367 |
| 2003/0228857 A1 | 12/2003 | Maeki | |
| 2004/0174298 A1 | 9/2004 | Eriksson | |
| 2004/0242156 A1 | 12/2004 | Tiirola et al. | |
| 2004/0247038 A1 | 12/2004 | Uesugi et al. | |
| 2005/0276347 A1 | 12/2005 | Mujtaba et al. | |
| 2006/0234645 A1 | 10/2006 | Lin et al. | |
| 2006/0248429 A1 | 11/2006 | Grandhi et al. | |
| 2007/0189412 A1 | 8/2007 | Xia et al. | |
| 2007/0205943 A1* | 9/2007 | Nassiri-Toussi et al. | 342/377 |
| 2008/0101493 A1 | 5/2008 | Niu et al. | |
| 2008/0108390 A1 | 5/2008 | Yoon et al. | |
| 2008/0134254 A1 | 6/2008 | Xia et al. | |
| 2008/0144751 A1 | 6/2008 | Xia et al. | |
| 2009/0046012 A1 | 2/2009 | Niu et al. | |
| 2009/0047910 A1 | 2/2009 | Niu et al. | |
| 2009/0121935 A1 | 5/2009 | Xia et al. | |
| 2009/0189812 A1 | 7/2009 | Xia et al. | |
| 2009/0193300 A1 | 7/2009 | Xia et al. | |
| 2009/0233556 A1 | 9/2009 | Xia et al. | |
| 2009/0238156 A1 | 9/2009 | Yong et al. | |
| 2010/0009635 A1 | 1/2010 | Qin et al. | |

FOREIGN PATENT DOCUMENTS

| | | |
|---|---|---|
| KR | 1020000071545 A | 11/2000 |
| KR | 1020010015765 A | 2/2001 |
| KR | 1020010018995 A | 3/2001 |
| KR | 1020020022109 A | 3/2002 |
| KR | 1020060068921 A | 6/2006 |
| WO | 0117131 A1 | 3/2001 |
| WO | 03090386 A1 | 10/2003 |

OTHER PUBLICATIONS

International Search Report dated Sep. 16, 2009 for International Application No. PCT/KR2009/000576 from Korean Intellectual Property Office, filed Feb. 6, 2009, pp. 1-2, Seo-gu, Daejeon, Republic of Korea.

International Search Report dated Jun. 29, 2009 for International Application No. PCT/KR2009/000373 from Korean Intellectual Property Office, filed Jan. 23, 2009, pp. 1-3, Seo-gu, Daejeon, Republic of Korea.

International Search Report and Written Opinion dated Aug. 28, 2009 for International Application No. PCT/KR2009/000365 from Korean Intellectual Property Office, filed Jan. 23, 2009, pp. 1-8, Seo-gu, Daejeon, Republic of Korea.

Van Veen, B.D. et al., "Beamforming: A Versatile Approach to Spatial Filtering," IEEE ASSP Magazine, vol. 5, No. 2, IEEE, Apr. 1988, pp. 4-24, United States.

Takeshita, O.Y., "On Maximum Contention-free Interleavers and Permutation Polynomials over Integer Rings," IEEE Transactions on Information Theory, vol. 52, No. 3, IEEE, Mar. 2006, pp. 1249-1253, United States.

Stüber, G.L. et al., "Broadband MIMO-OFDM Wireless Communications," Proceedings of the IEEE, vol. 92, No. 2, IEEE, Feb. 2004, pp. 271-294, United States.

Scintera Networks, "Advanced Signal Processing Platform™," Scintera Networks, Sep. 2003, pp. 1-9, United States.

Ryu, J. et al., "On Quadratic Inverses for Quadratic Permutation Polynomials over Integer Rings," IEEE Transactions on Information Theory, vol. 52, No. 3, IEEE, Mar. 2006, pp. 1254-1260, United States.

Razavi, B., "Challenges in Portable RF Transceiver Design," IEEE Circuits and Devices Magazine, vol. 12, No. 5, IEEE, Sep. 1996, pp. 12-25, United States.

Lakkis, I. et al., "Project: IEEE P802.15 Working Group for Wireless Personnel Area Networks (WPANs), mmWave Beamforming (IEEE 802.15-08-0055-01-003c)," IEEE, Nov. 12, 2006 and Jan. 15, 2008, pp. 1-64, United States.

Niu, H. et al., "Beamforming for Space-Time Coded IEEE 802.11n System with Known Fading Correlations," Proceedings of the 2005 Thirty-ninth Asilomar Conference on Signals, Systems, and Computers, IEEE, 2005, pp. 1014-1018, United States.

PHYSorg.com, "NEC Develops Compact Millimeter-Wave Transceiver for Uncompressed HDTV Signal Transmission," PHYSorg.com, Apr. 1, 2005, pp. 1-2, United States, downloaded from http://www.physorg.com/news3569.html on Sep. 29, 2006.

Lin, S. et al., "Error Control Coding—Fundamental and Applications, Chapter 16: Turbo Coding," Second Edition, Pearson Prentice Hall, 2004, pp. 774-780, United States.

LG Electronics, Inc. et al., "WirelessHD Specification Version 1.0 Overview," LG Electronics, Inc. et al., Oct. 9, 2007, pp. 1-77, United States.

(56) References Cited

OTHER PUBLICATIONS

IEEE Computer Society, "IEEE Std 802.15.3™-2003 IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," IEEE, Sep. 29, 2003, pp. i-315, New York, United States.
802.11 Working Group of the 802 Committee, "IEEE P802.11n™/D1.0 Draft Amendment to Standard for Information Technology—Telecommunications and Information Exchange Between Systems—Local and Metropolitan Networks—Specific requirements—Part 11: Wireless LAN Medium Access Control (MAC) and Physical Layer (PHY) Specifications: Enhancements for Higher Throughput," IEEE, Mar. 2006, pp. i-328, United States.
Hitachi, LTD. et al., "High-Definition Multimedia Interface Specification Version 1.2," HDMI Licensing, LLC, Aug. 22, 2005, pp. i-110 and CEC-i—CEC-84, United States.
Hansen, R.C., "Phased Array Antennas", Wiley Series in Microwave and Optical Engineering, John Wiley & Sons, Inc., 1998, pp. i-486, New York, United States.
Hachman, M., "CE Giants back Amimon's Wireless HDTV Tech," ExtremeTech.com, Jul. 23, 2008, p. 1, United States.
Furrer, S. et al., "Bounds on the Ergodic Capacity of Training-based Multiple-Antenna Systems," Proceedings of the 2005 International Symposium on Information Theory, IEEE, Sep. 4-9, 2005, pp. 780-784, United States.
De Los Santos, H.J., "Introduction to Microelectromechanical (MEM) Microwave Systems, MEMS-based Microwave Circuits and Systems," Artech House, 1999, pp. 167-168 and 193, United States.
Coffey, S. et al., "Joint Proposal: High Throughput Extension to the 802.11 Standard: PHY (IEEE 802.11-05/1102r4)," IEEE, Jan. 13, 2006, pp. 1-82, United States.
Buzzi, S. et al., "Performance of Iterative Data Detection and Channel Estimation for Single-Antenna and Multiple-Antennas Wireless Communications," IEEE Transactions on Vehicular Technology, vol. 53, No. 4, Jul. 2004, pp. 1085-1104, United States.
Butler, J. et al., "Beam-Forming Matrix Simplifies Design of Electronically Scanned Antennas," Electronic Design, Apr. 12, 1961, pp. 170-173, United States.
LG Electronics, Inc. et al., "WirelessHD Specification Specification Summary," WirelessHD, LLC, Feb. 2007, pp. 1-8, United States.
Takeshita, O.Y. et al., "On Maximum Contention-Free Interleavers and Permutation Polynomials Over Integer Rings," IEEE Transactions on Information Theory, IEEE, Nov. 1, 2005, pp. 1-13, United States.
U.S. Non-Final Office Action for U.S. Appl. No. 11/881,978 mailed May 20, 2010.
U.S. Notice of Allowance for U.S. Appl. No. 11/890,207 mailed Jan. 11, 2010.
U.S. Final Office Action for U.S. Appl. No. 11/890,207 mailed Oct. 26, 2009.
U.S. Notice of Allowance for U.S. Appl. No. 11/881,978 mailed Sep. 15, 2009.
U.S. Non-Final Office Action for U.S. Appl. No. 11/881,978 mailed Jul. 25, 2008.
U.S. Non-Final Office Action for U.S. Appl. No. 11/881,978 mailed Jan. 2, 2009.
U.S. Non-Final Office Action for U.S. Appl. No. 11/890,207 mailed Apr. 6, 2009.
U.S. Advisory Action for U.S. Appl. No. 11/890,207 mailed Mar. 2, 2009.
U.S. Final Office Action for U.S. Appl. No. 11/890,207 mailed Nov. 24, 2008.
U.S. Non-Final Office Action for U.S. Appl. No. 11/890,207 mailed Jun. 23, 2008.
U.S. Notice of Allowance for U.S. Appl. No. 12/189,747 mailed Mar. 18, 2011.
U.S. Notice of Allowance for U.S. Appl. No. 11/881,978 mailed Oct. 28, 2010.
U.S. Non-Final Office Action for U.S. Appl. No. 12/050,071 mailed Apr. 27, 2011.
U.S. Notice of Allowance for U.S. Appl. No. 12/189,749 mailed Dec. 29, 2010.
Caetano, L., "SiBEAM—60 GHz Architecture for Wireless Video Display," SiBEAM, Inc., White Paper, Mar. 2006, pp. 1-6, United States.
U.S. Final Office Action for U.S. Appl. No. 12/050,071 mailed Oct. 26, 2011.
U.S. Non-Final Office Action for U.S. Appl. No. 12/189,726 mailed Dec. 13, 2011.
U.S. Non-Final Office Action for U.S. Appl. No. 12/172,853 mailed Jun. 6, 2012.
U.S. Notice of Allowance for U.S. Appl. No. 12/189,726 mailed Apr. 26, 2012.
U.S. Notice of Allowance for U.S. Appl. No. 12/050,071 mailed Nov. 7, 2012.
U.S. Final Office Action for U.S. Appl. No. 12/172,853 mailed Dec. 18, 2012.
U.S. Notice of Allowance for U.S. Appl. No. 12/172,853 mailed Mar. 1, 2013.

\* cited by examiner

| FIG. 2A | FIG. 2B |
|---|---|

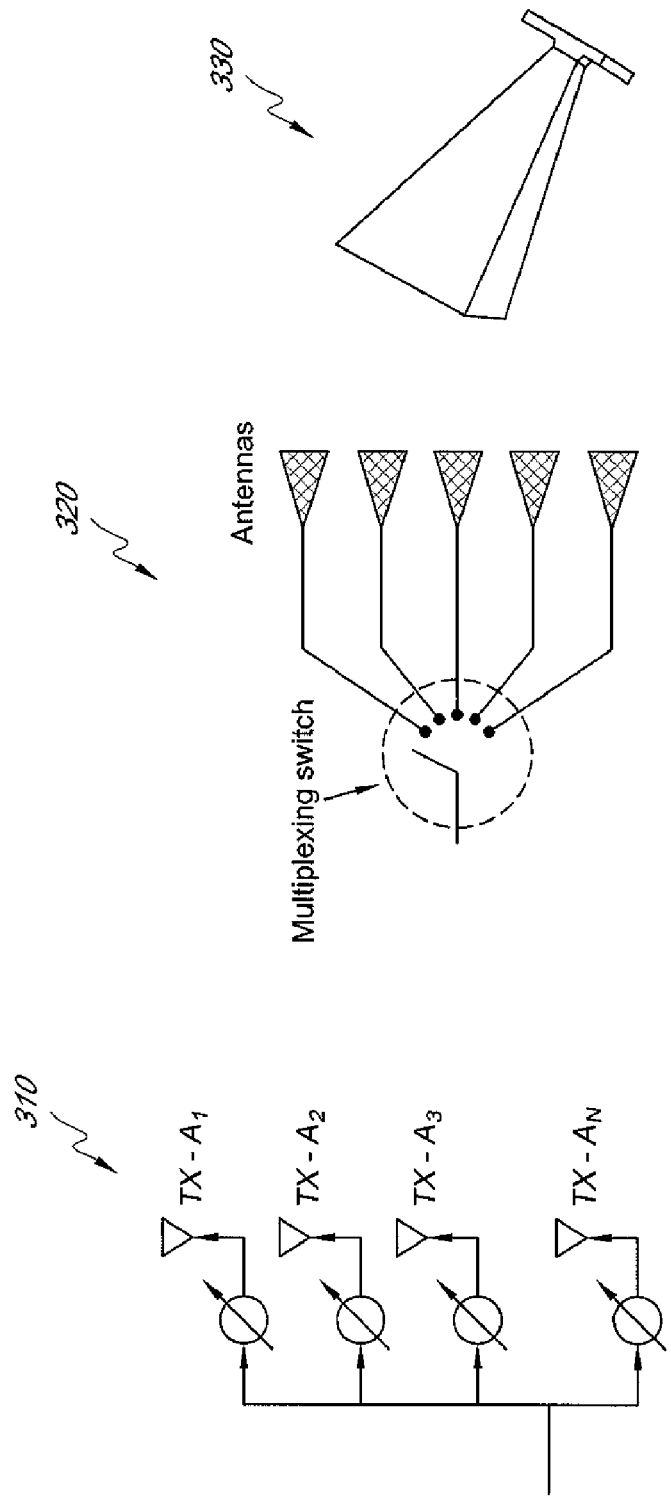

FIG. 4

| Octets: 1 | 1 | 2 | 2 | ...... | 1 |
|---|---|---|---|---|---|
| IE index | IE index | SC mode support | OFDM mode support | ...... | Explicit/ implicit feedback |
| 410 | 420 | 430 | 440 | | 450 |

| Octets: 1 | 1 | 1 | 1 |
|---|---|---|---|
| Number of TX elements | Number of RX elements | TX antenna type | RX antenna type |
| 510 | 520 | 530 | 540 |

| BPSK modulated M-sequence | BPSK modulated M-sequence | BPSK modulated M-sequence | - - - | BPSK modulated M-sequence |
|---|---|---|---|---|
| 1 | 2 | 3 | | N |

600

SYSTEM AND METHOD FOR EFFICIENT TRANSMIT AND RECEIVE BEAMFORMING PROTOCOL WITH HETEROGENEOUS ANTENNA CONFIGURATION

CROSS-REFERENCES TO RELATED APPLICATIONS

The application is a continuation of U.S. patent application Ser. No. 12/189,747, filed Aug. 11, 2008, which, in turn claims the benefit under 35 U.S.C. §119(e) of U.S. Provisional Application No. 60/955,613, filed on Aug. 13, 2007, both incorporated herein by reference.

BACKGROUND OF THE INVENTION

1. Field of the Invention

The present invention relates to wireless networks, and in particular to acquiring the optimal directional transmission in a wireless communication system.

2. Description of the Related Technology

One of the major challenges for millimeter wave (mm-wave) gigabit per second (Gbps) communications is the poor link budget, as a radio signal propagating in the mm-wave frequency band experiences significant path loss, reflection loss and other degradation. Given the lossy nature of the radio channel as well as the limited CMOS performance at a mm-wave band, Gbps communications becomes very challenging. To improve the link quality, directional transmission is generally preferred.

Due to the extremely short wavelength, it becomes possible and beneficial to integrate a large number (e.g., between 10 and 64) of antenna elements into an antenna package. Antenna based beamforming thus emerges as an attractive solution, featuring high beamforming gain and electronic steerability. An improvement in signal-to-noise (S/N) ratio can be achieved by periodically performing antenna trainings in a beamforming wireless system.

BRIEF SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of training antennas for two devices having heterogeneous antenna configurations in a wireless network, the method comprising communicating one or more estimation training sequences between two devices, one with a phased array antenna and the other with a switched array antenna, wherein a beamforming vector of the phased array antenna is switched between phase vectors within a set of weight vectors while the switched array antenna is switched within a plurality of antenna sectors; tuning at least one of the phase array and switched array antennas with an antenna parameter selected based at least in part on the one or more estimation training sequences; and communicating data messages via at least one of the phase array and switched array antennas so tuned.

In another embodiment, there is a method of antenna training for two devices having heterogeneous antenna configurations in a wireless network, the method comprising a) transmitting a first estimation training sequence via a phased array antenna, wherein a beamforming vector of the phased array antenna is switched between phase vectors within a set of weight vectors while a switched array antenna at a receiver is fixed to a first antenna sector; b) transmitting a next estimation training sequence via the phased array antenna, wherein the beamforming vector of the phased array antenna is switched between phase vectors within the set of weight vectors while the switched array antenna at the receiver is fixed to a new antenna sector; c) repeating b) for a finite number of times, each with a different antenna sector at the receiver; d) receiving a feedback message indicative of a phase vector that is selected based at least in part on the transmitted estimation training sequences; and e) transmitting data to the receiver via the phased array antenna at the transmitter tuned with the selected phase vector.

In another embodiment, there is a method of antenna training for two devices having heterogeneous antenna configurations in a wireless network, the method comprising transmitting a plurality of estimation training sequences via a phased array antenna, wherein a beamforming vector of the phased array antenna is switched between phase vectors within a set of weight vectors while a switched array antenna at a receiver is fixed to a different antenna sector for each of the estimation training sequences; and transmitting data via the phased array antenna tuned to a phase vector that is selected based at least in part on the transmitted estimation training sequences.

In another embodiment, there is a method antenna training for two devices having heterogeneous antenna configurations in a wireless network, the method comprising a) transmitting a first estimation training sequence via a switched array antenna, wherein a beamforming vector of a phased array antenna at a receiver is switched between phase vectors within a set of weight vectors while a transmit switched array antenna is fixed to a first antenna sector; b) transmitting a next estimation training sequence via the switched array antenna wherein the beamforming vector of the phased array antenna at the receiver is switched between phase vectors within the set of weight vectors while the transmit switched array antenna is fixed to a new antenna sector; c) repeating b) for a finite number of times, each with a different antenna sector at the transmitter; d) receiving a feedback message indicative of an antenna sector that is selected based at least in part on the transmitted estimation training sequences; and e) transmitting data to the receiver via the switched array antenna fixed to the selected antenna sector.

In another embodiment, there is a method of antenna training for two devices having heterogeneous antenna configurations in a wireless network, the method comprising transmitting a plurality of estimation training sequences via a switched array antenna, wherein a beamforming vector of a phased array antenna at a receiver is switched between phase vectors within a set of weight vectors while the switched array antenna is fixed to a different antenna sector for each of the estimation training sequences; and transmitting data via the phased array antenna tuned to a phase vector that is selected based at least in part on the transmitted estimation training sequences.

In another embodiment, there is a system for training antennas for two devices having heterogeneous antenna configurations in a wireless network, the system comprising a phased array antenna; and a processor in data communication with the phased array antenna and configured to a) transmit a first estimation training sequence via the phased array antenna, wherein a beamforming vector of the phased array antenna is switched between phase vectors within a set of weight vectors while a switched array antenna at a receiver is fixed to a first antenna sector, b) transmit a next estimation training sequence via the phased array antenna, wherein the beamforming vector of the phased array antenna is switched between phase vectors within the set of weight vectors while the switched array antenna at the receiver is fixed to a new antenna sector, c) repeat b) for a finite number of times, d) receive a feedback message indicative of a phase vector that is selected based at least in part on the transmitted estimation training sequences, and e) transmit data to the receiver via the phased array antenna tuned with the selected phase vector.

In another embodiment, there is a system for training antenna for two devices having heterogeneous antenna configurations in a wireless network, the system comprising a switched array antenna; and a processor in data communication with the switched array antenna and configured to a) transmit a first estimation training sequence via the switched array antenna, wherein a beamforming vector of a phased array antenna at a receiver is switched between phase vectors within a set of weight vectors while the switched array antenna is fixed to a first antenna sector, b) transmit a next estimation training sequence via the switched array antenna, wherein the beamforming vector of the phased array antenna at the receiver is switched between phase vectors within the set of weight vectors while the switched array antenna is fixed to a new antenna sector, c) repeat b) for a finite number of times, d) receive a feedback message indicative of an antenna sector that is selected based at least in part on the estimation training sequences, and e) transmit data to the receiver via the switched array antenna fixed to the selected antenna sector.

BRIEF DESCRIPTION OF THE SEVERAL VIEWS OF THE DRAWINGS

FIGS. 3(a)-(c) are diagrams showing examples of different types of directional antenna that can be incorporated in transmit or receive devices such as the ones shown in FIG. 2.

FIG. 4 is a diagram showing an example Physical Layer (PHY) capability information element (IE) of a device and a coordinator that can be included in an association request and response commands, respectively.

FIG. 5 is a diagram showing an example antenna support element that can be included in a PHY capability IE such as the one shown in FIG. 4.

FIG. 6 is a diagram showing an example training sequence where the training sequence length is adapted to a particular type and number of antennas.

DETAILED DESCRIPTION OF THE INVENTION

Certain embodiments provide a method and system for an efficient transmit and receive beamforming protocol with heterogeneous directional antennas such as phased array antennas and switched array antennas. In some embodiments, the throughput of the wireless network is improved by beamforming different types of antennas belonging to transmit and receive devices via the heterogeneous beamforming protocol described below.

The following detailed description is directed to certain sample embodiments of the invention. However, the invention can be embodied in a multitude of different ways as defined and covered by the claims. In this description, reference is made to the drawings wherein like parts are designated with like numerals throughout.

Various embodiments of the beamforming protocol for heterogeneous directional antennas described herein can be applied to various wireless standards including IEEE 802.15.3c and ECMA TC48 standards on mm-wave communication networks and are able to support transmit-receive devices that may use different antenna types with varying number of antenna elements. In addition, the training overhead can be minimized by adapting the training sequence length to the number of antenna elements.

The beamforming protocol described herein can support directional transmissions between diverse antenna configurations, including a switched (sectored) array antenna, a phased array antenna, and a single antenna element. Antenna training protocols for homogeneous antenna configurations involving the same types of antennas (e.g., the phased array antennas) at both the transmit and receive devices have been disclosed in U.S. patent application Ser. No. 11/881,978, entitled "Method and System For Analog Beamforming In Wireless Communication System", filed on Jul. 30, 2007, herein incorporated by reference in its entirety. Beamforming protocols for heterogeneous antenna configurations, including the following two example antenna configurations, will be described below:

1. The transmit device (STA1) transmits data via a phased array antenna having N1 antenna elements, and the receive device (STA2) receives the data via a switched array antenna having N2 antenna elements; and 2. The transmit device (STA1) transmits data via a switched array antenna having N1 antenna elements, and the receive device (STA2) receives the data transmitted by the STA2 via a phased array antenna having N2 antenna elements.

Data wirelessly transmitted between devices via antennas trained with certain embodiments of the beamforming protocol described herein may include one or more of motion video, still images, or any other suitable type of multimedia data.

Figure 1:
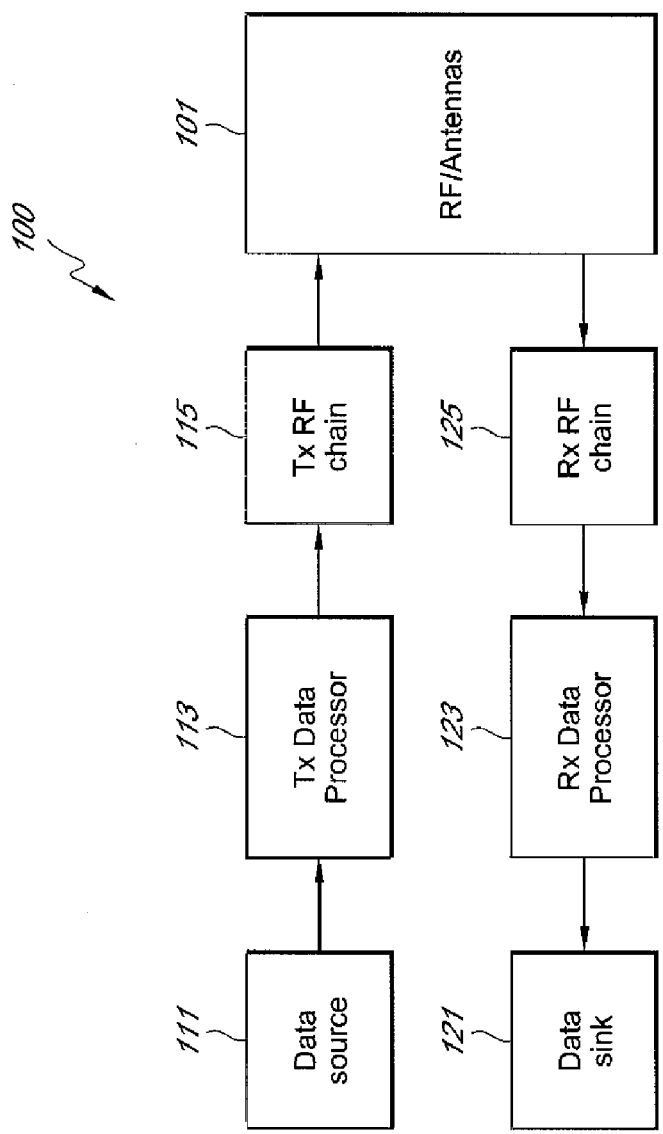
FIG. 1 is a functional block diagram illustrating an example transceiver structure that can represent a communication device incorporating the efficient beamforming protocol in a wireless system according to certain embodiments.

FIG. 1 is a functional block diagram illustrating an example transceiver structure 100 of communication devices that can transmit as well as receive data. The transceiver structure 100 includes a data source 111, a transmit (TX) data processor 113, a TX radio frequency (RF) chain 115, a receive (RX) RF chain 125, a RX data processor 123, a data sink 121, and RF/Antennas module 101.

The operation of the transceiver structure 100 in the transmit mode is now described. In certain embodiments, the data source 111 includes one or more memories for storing data to be transmitted. The TX data processor 113 receives the data from the data source 111 and processes the received data. The data processing can include, for example, an inverse Fast Fourier Transform (FFT), data compression, or security encoding performed in the digital domain. The TX RF chain 115 receives the processed digital data and converts it into an analog data waveform. The RF/Antennas module 101 includes a transmit antenna and TX RF electronics (not shown). The RF/Antennas module 101 receives the analog data waveform and, after the TX RF electronics perform additional analog signal processing, e.g., baseband mixing and amplification, on the analog data waveform, the transmit antenna wirelessly transmits the analog data waveform.

The operation of the transceiver structure 100 in the receive mode is now described. The RF/Antennas module 111 includes a receive antenna and RX RF electronics (not shown). The receive antenna receives an analog data waveform and the RX RF electronics performs additional analog signal processing, e.g., amplification and baseband de-mixing. The RX RF chain 125 receives the analog data waveform from the RF/Antennas module 101 and converts it into digital data. The RX data processor 123 receives the digital data from the RX RF chain 125 and processes the received data. The data processing can include a FFT, data decompression, or security decoding performed in the digital domain. The processed data is then stored in the data sink 121.

Figures 2, 2A:
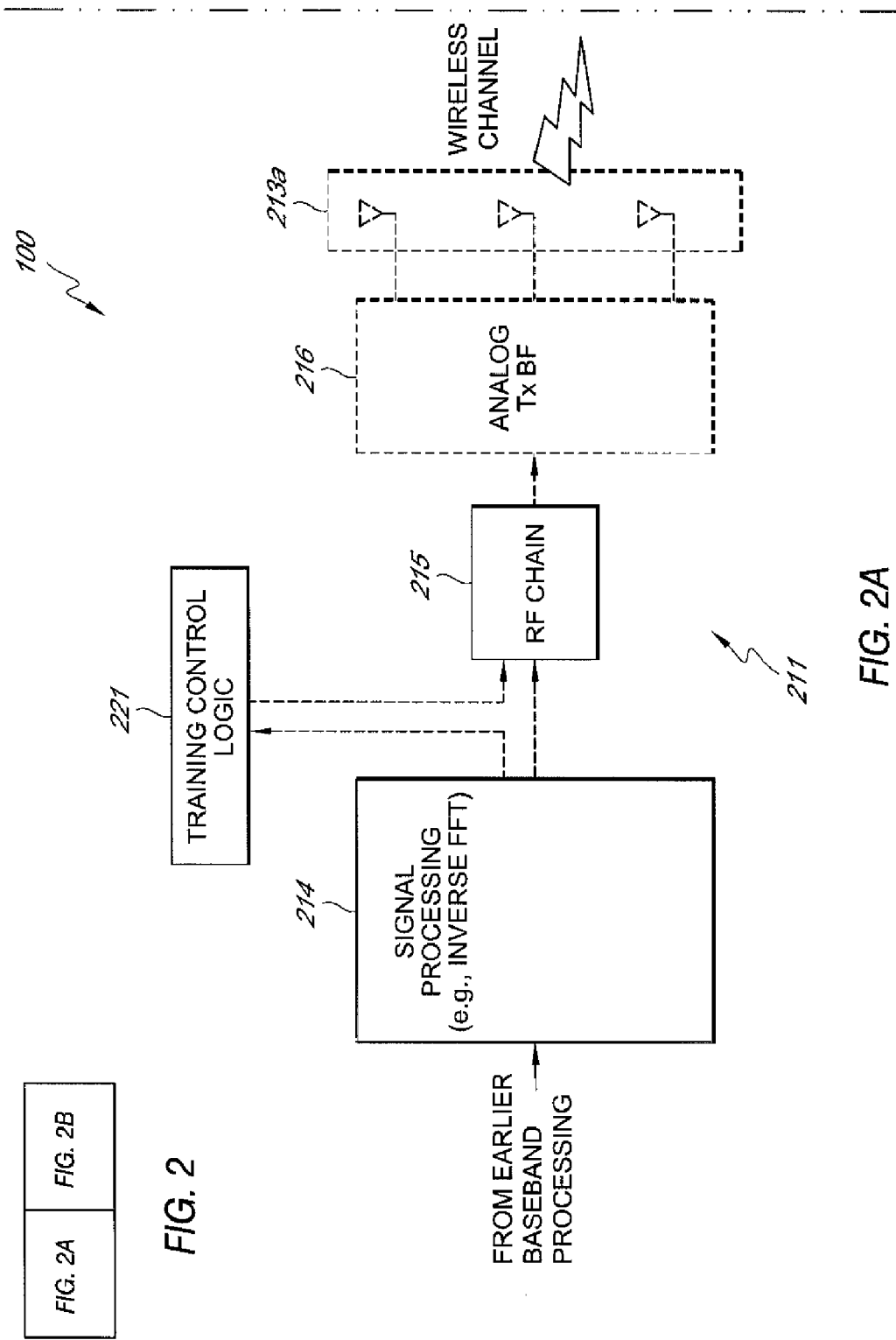
FIG. 2 is a functional block diagram of an example beamforming wireless system comprising two beamforming communication devices—a transmitter and a receiver—that are configured to perform an antenna training session prior to transmitting data using the trained antennas.
Figure 2B:
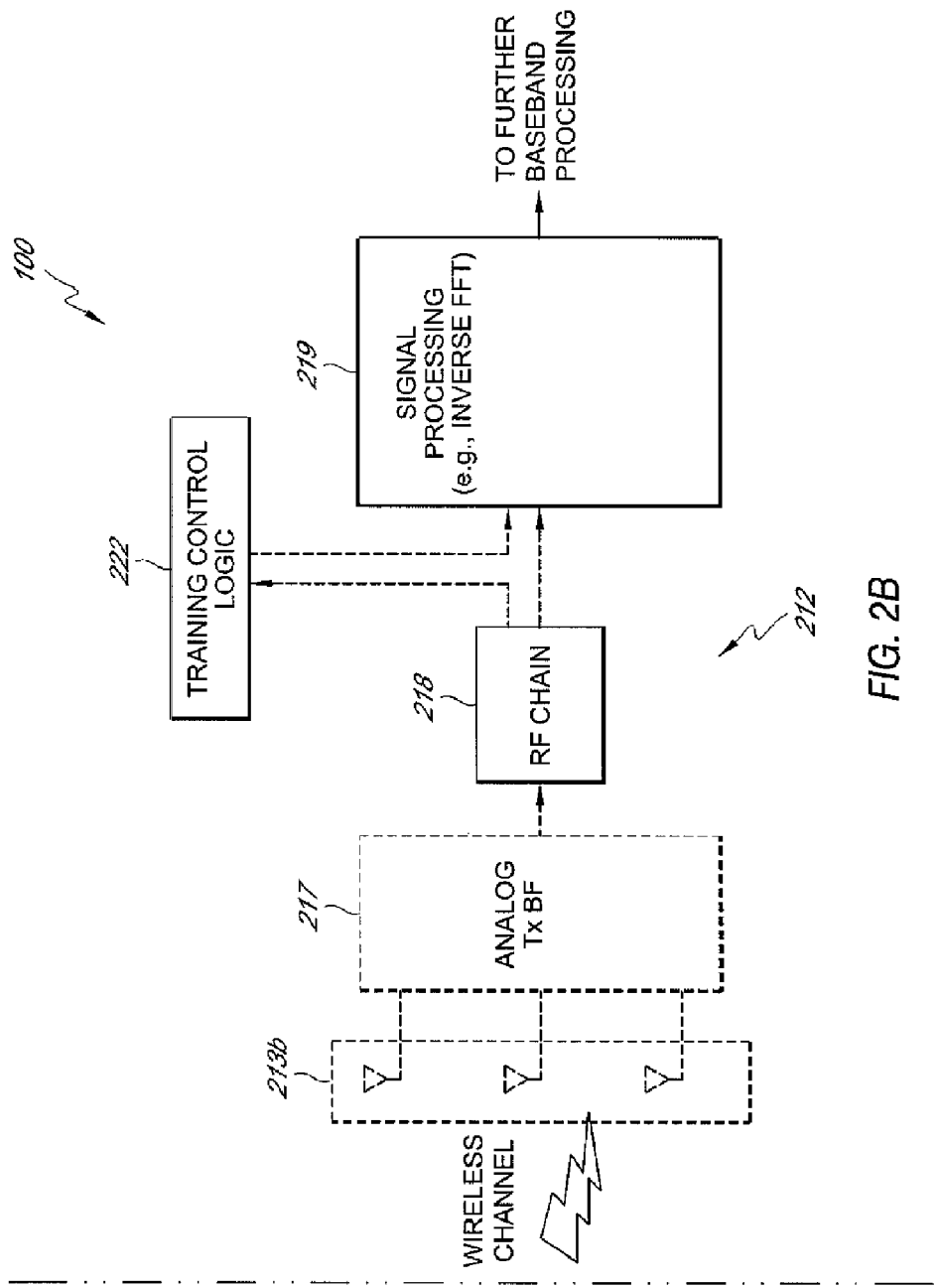

Before a pair of communication devices, e.g., transmit and receive devices, with directional antennas engaging in data communication, the devices typically perform an antenna training process in order to improve the signal-to-noise ratio through beamforming. The antenna training process includes estimation of the antenna weighting coefficients of the directional antennas belonging to the transmitters and receivers. As used herein, beamforming refers to applying appropriate weighting coefficients for different antenna elements of the antenna. FIG. 2 is a functional block diagram of an example beamforming wireless system 200 comprising two beamforming communication devices—a transmitter 211 and a receiver 212—that are configured to perform an antenna training session prior to transmitting data via beamforming, e.g., audio and/or video (A/V) data. The transmitter 211 and receiver 212 include transmit and receive antennas 213a and 213b, respectively. In the illustrated example, the beamforming wireless system 200 is an analog beamforming wireless system as the beamforming (antenna weighting) operation is carried out in the analog domain. However, it will be appreciated that the system 200 can be a digital beamforming wireless system. In some embodiments, each of the transmitter and receiver contains a directional antenna comprising multiple antenna elements.

FIGS. 3(a)-(c) show different types of directional antennas that can be incorporated in transmit or receive devices such as the ones shown in FIG. 2. In some embodiments, the directional antenna includes a phased array antenna 310 represented by FIG. 3(a). In other embodiments, the directional antenna includes a switched array antenna 320 represented by FIG. 3(b). In yet other embodiments, the directional antenna includes a single element directional antenna 330 represented by FIG. 3(c). Various embodiments of the beamforming protocol for heterogeneous directional antennas described herein utilize different types of directional antennas at the transmitter and the receiver. For example, in certain embodiments, the transmit antenna 213a (FIG. 2) at the transmitter 211 can be the phased array antenna 310, and the receive antenna 213b at the receiver 212 can be the switched array antenna 320. In other embodiments, the transmit antenna 213a at the transmitter 211 can be the switched array antenna 320, and the receive antenna 213b at the receiver 212 can be the phased array antenna 310. In yet other embodiments, the transmit antenna 213a at the transmitter 211 can be either the phased array antenna 310 or the switched array antenna 320, and the receive antenna 213b at the receiver 212 can be the single element directional antenna 330. In yet other embodiments, the transmit antenna 213a at the transmitter 211 can be the single element directional antenna 330, and the receive antenna 213b at the receiver 212 can be either the phased array antenna 310 or the switched array antenna 320.

The transmit (TX) function of the transmitter 211 (FIG. 2) includes a signal processing module 214. The signal processing module 214 receives a baseband signal that has undergone an earlier baseband processing, and performs, for example, an inverse Fast Fourier Transform (IFFT) which converts the signal from the frequency domain into a time domain digital signal. In certain embodiments, the signal processing module 214 can include a processor (not shown), e.g., a microprocessor, a digital signal processor (DSP), a programmable gate array (PGA) and the like, for performing the IFFT and other signal processing functions. The digital signal is then converted into an analog waveform by a digital to analog (D/A) function of an RF chain 215, and then transmitted to the receiver 212 via the transmit antenna 213a after analog beamforming (BF) by an analog TX BF function module 216. The transmitter 211 can also include a training control module 221 that is used during an antenna training session. During the antenna training session, the digital signal output from the signal processing module 214 is bypassed to the training control module 221 where at least part of an antenna beamforming algorithm is applied. During the antenna training session, the training control module 221 generates one or more training sequences. The training sequence then flows into the RF chain 215, where it is converted into an analog waveform, and transmitted to the receiver 212 as described above.

The receive (RX) function of the receiver 212 includes an analog RX BF function module 217, which cooperatively with the analog TX BF function 216 provides analog beamforming. A signal transmitted from the transmitter 211 is received by the receiver 212 via the receive antenna 213b. The received signal flows into the analog RX BF function 217. The analog output signal from the analog RX BF function 217 is converted to a digital signal in an RF chain 218, and then converted to a frequency domain baseband signal by, for example, an FFT module inside a signal processing module 219. The frequency domain baseband signal is then output for a further baseband processing. The receiver 212 can also include its own training control module 222 that is used during an antenna training session. During the antenna training session, a digital signal representing a training sequence received from the transmitter 211 is bypassed to the training control module 222 where at least part of the antenna beamforming algorithm is applied.

The antenna training algorithm performed by the training control module 221, 222 depends on the antenna configuration. For example, assume that the transmit antenna 213a is the phased array antenna 310 (FIG. 3a), and the receive antenna 213b is the switched array antenna 320. Then, the part of the antenna beamforming algorithm performed by the training control module 221 at the transmitter 211 can include transmitting training sequences via the phased array antenna configured with different estimated beamforming coefficients, while the part of the antenna beamforming algorithm performed by the training control module 222 can include scanning different antenna sectors of the switched array antenna to receive the training sequences transmitted by the transmitter 211 and computing or estimating a link quality indicator (LQI) associated with the received training sequences. Various measures of LQI can be used. Some embodiments based on LQI employ signal-to-noise ratios (SNRs) associated with the received training sequences. One of the SNR embodiments employs a maximum-likelihood (ML) SNR estimator technique. Other embodiments based on LQI employ received signal strength indicators (RSSIs). Yet other embodiments based on LQI employ signal to noise and interference ratios (SNIRs).

A wireless network needs to support diverse device configurations, e.g., devices with different types of antennas and antenna elements. Certain embodiments provide a general efficient beamforming protocol with features that can support diverse device configurations. In one feature, information regarding a type of antenna and a number of elements in the antenna is exchanged during association. In the beamforming protocol, one of the devices in the network, e.g., a transmitter, sends an association request command to another device, e.g., a receiver, in the network and the receiver responds by sending an association response command to the transmitter. The association request command can include a physical layer (PHY) capability information element to indicate the transmitter's PHY capability. The association response command can include the PHY capability information element (IE) to indicate the receiver's PHY capability. In an infrastructure-based network, the receiver can be a coordinator. An example PHY capability IE 400 is shown in FIG. 4. The PHY capability IE 400 includes an Informational Element (IE) index element 410, a Length index 420, a Single Carrier (SC) mode support field 430, an Orthogonal Frequency Division Multiplexing (OFDM) mode support field 440 and an Explicit/Implicit feedback field 450. An example antenna support element 500 that can be included in the PHY capability IE 400 is shown in FIG. 5. The example antenna support element 500 includes a first field 510 indicating a number of transmitter (TX) antenna elements, a second field 520 indicating a number of receive (RX) antenna elements, a third field 530 indicating an antenna type of the transmitter, and a fourth field 540 indicating an antenna type of the receiver.

The beam search training sequence can use a pseudo-random number (PN) sequence. The sequence can be any random sequence with constant amplitude and good autocorrelation properties, such as an M-sequence. The PN sequence can be modulated by digital modulation, such as Binary Phase Shift Keying (BPSK), Quadrature Phase Shift Keying (QPSK), Differential Binary Phase Shift Keying (DBPSK) or Offset Quadrature Phase Shift Keying (OQPSK), for transmission. In some embodiments, the same training sequence is repeated a number of times in the temporal domain, while at the same time, the spatial pattern for each repetition of the training sequence can be varying during the training process. In this application, the term "training sequence length" refers to the number of repeated training sequences in the temporal domain.

In the current practice, the training sequence length is fixed to a certain number of maximum antennas, e.g., Nmax. The current practice, however, can lead to a considerable waste in training time since the antennas involved in the training may have less than Nmax number of antenna elements. In certain embodiments of the beamforming protocol described herein, however, the waste in training time due to a fixed Nmax is avoided by adapting the training sequence length to certain characteristics of at least one of the transmit and receive antennas, such as the types of antennas and numbers of antenna elements. The system and method of adapting the training sequence length to the number of antenna elements is described in a companion application entitled "SYSTEM AND METHOD FOR TRAINING THE SAME TYPE OF DIRECTIONAL ANTENNAS THAT ADAPT THE TRAINING SEQUENCE LENGTH TO THE NUMBER OR ANTENNAS," U.S. application Ser. No. 12/189,749, which is incorporated herein by reference in its entirety. FIG. 6 shows an example training sequence where the training sequence length is adapted to a particular type of antenna and the number of antenna elements. The example training sequence includes N temporally-repeated BPSK modulated pseudo random noise (PN) sequences. The PN sequences can be any random sequences such as M-sequences, where N depends on the number and type of antennas at the transmitter and receiver. For example, as will be described below, if one of the transmit and receive antennas is a phased array antenna, the training sequence length, N, can be set to the number of weight vectors spanning the phase space for the phased array antenna. On the other hand, if the transmit and receive antennas are both switched array antennas, the training sequence length, N, can be set to the number of antenna elements, i.e., sectors, for the switched array antennas.

In the following paragraphs, training sequences and protocols are described in detail for certain heterogeneous device configurations in which a phased array antenna device is coupled with a switched array antenna device. It is hereinafter assumed for these examples that the directional transmission—the direction of the data transmission for which the antenna is being trained—is from STA1 to STA2 and that the antenna at the STA1 has N1 antenna elements and the antenna at the STA2 has N2 antenna elements.

STA1: Phased Array Antenna Device/STA2: Switched Array Antenna Device

Figure 7:
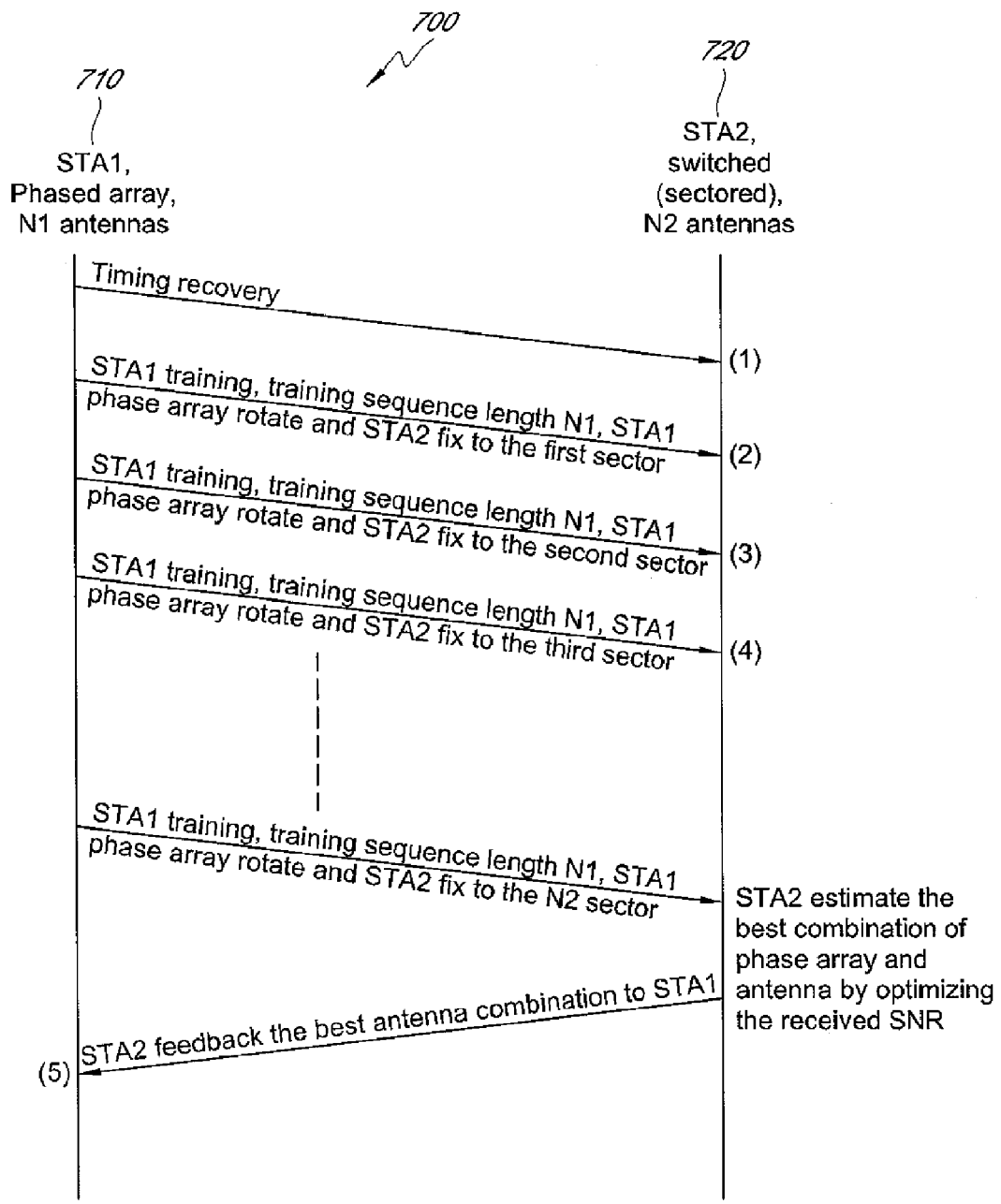
FIG. 7 is a message exchange chart illustrating an example antenna training protocol involving a phased array antenna at the transmitter and a switched array antenna at the receiver.

Once the antenna types are determined as a phased array antenna at the transmitter (STA1) and a switched array antenna at the receiver (STA2) from the association procedure described above, the protocol can follow the example procedure 700 illustrated in FIG. 7 and described below. For the purpose of the discussion hereafter, the following is assumed: The phased array antenna includes N1 antenna elements, and the phase space for the phased array antenna is defined by N1 weight vectors. The switched array antenna includes N2 antenna sectors.

a. Beam Search Stage 1 (Timing Recovery) Training Sequence

During a first beam search stage (Stage 1), STA1 710, e.g., the transmitter 211 (FIG. 2), transmits a Stage 1 training sequence (1) that is used for timing recovery estimation and/or automatic gain control (AGC) to STA2 720, e.g., the receiver 212 (FIG. 2).

b. Beam Search Stage 2 (STA1 Training) Training Sequence

During a second beam search stage (Stage 2), the STA1 710 transmits a Stage 2 training sequence (2) to the STA2 720. The training sequence length is again set to N1. During the Stage 2 training sequence (2), the STA1 beamforming vector switches between phase vectors within the same set of weight vectors as in Stage 1, while the STA2 is fixed to the first sector (direction) of the switched array antenna.

c. Beam Search Stages 3, 4, . . . N2+1 (STA1 Training) Training Sequences

During beam search stages 3, 4, . . . , N2+1, the STA1 710 transmits Stage 3, 4, . . . N2+1 training sequences (4) to the STA2 720. The training sequence lengths are again set to N1. During each of the stages, the STA1 beamforming vector switches between phase vectors within a same set of weight vectors as in stage 1, while the STA2 is fixed to a second sector, a third sector, . . . , and N2$^{th}$ sector, respectively.

During or after the reception of the estimation sequences, the STA2 720 optimizes the received SNRs or other LQI in other embodiments. The SNR optimization can include estimating SNR values for N1×N2 training sequences received by the STA2 and finding the highest SNR value. This process leads to a set of an optimal transmit phase vector and an optimal receive antenna sector that is determined to yield the highest SNR value among N1×N2 possible combinations of phase vectors and antenna sectors.

d. Stage N2+2, Feedback

After the SNR optimization, the STA2 720 transmits a feedback message (5) to the STA1 710. The feedback message (5) indicates the optimal transmit phase vector at STA1 that is determined to yield the highest SNR value. Subsequently, the STA1 710 uses the optimal transmit phase vector to tune its phased array antenna and transmit data to the STA2 via the phased array antenna so tuned.

STA1: Switched Array Antenna Device/STA2: Phased Array Antenna Device

Figure 8:
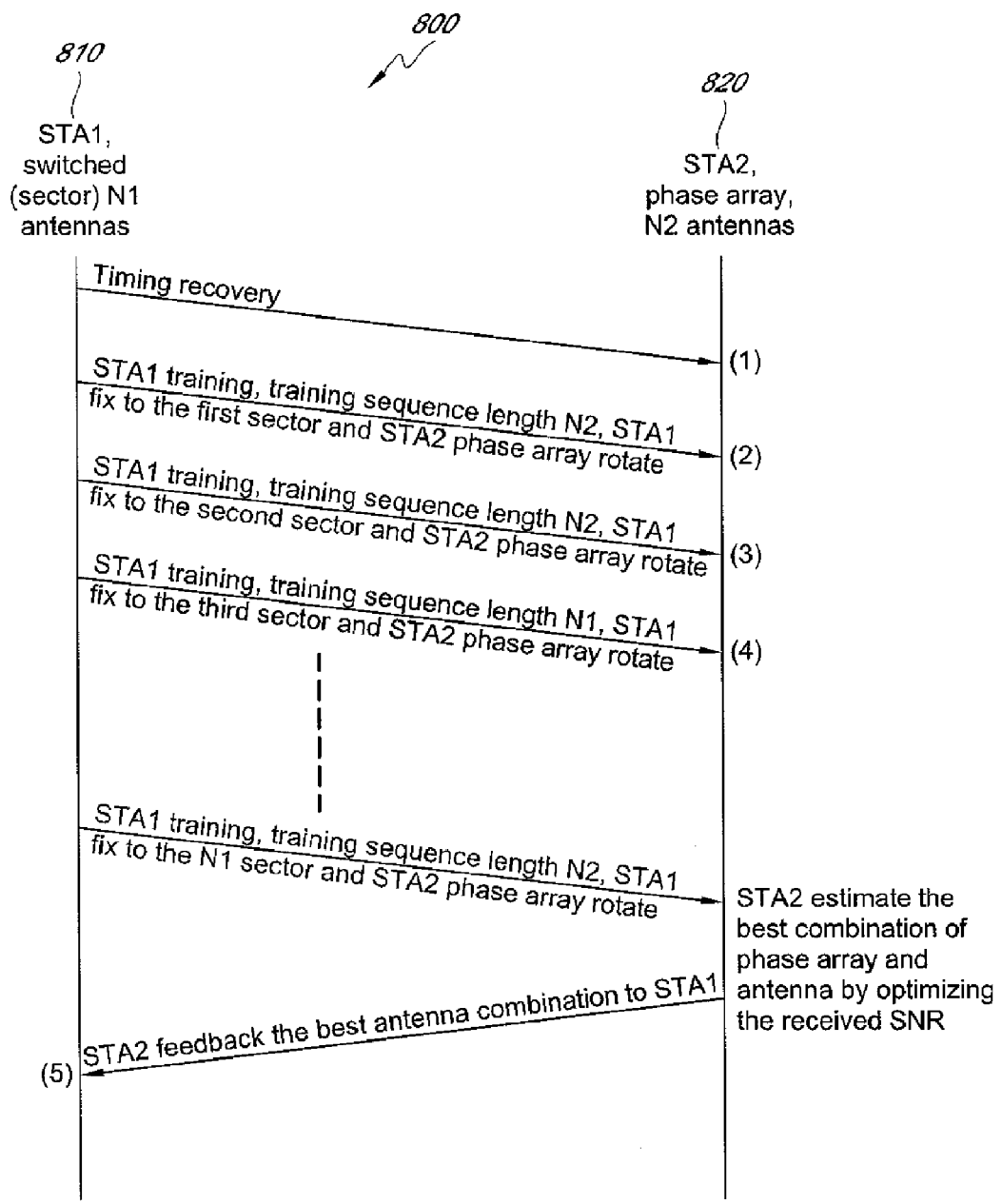
FIG. 8 is a message exchange chart illustrating an example antenna training protocol involving a switched array antenna at the transmitter and a phased array antenna at the receiver.

Once the antenna types are determined as a switched array antenna at the transmitter (STA1) and a phased array antenna at the receiver (STA2) from the association procedure described above, the protocol can follow the example procedure 800 illustrated in FIG. 8 and described below. For the purpose of the discussion hereafter, the following is assumed: The switched array antenna at STA1 includes N1 antenna sectors. The phased array antenna at STA2 includes N2 antenna elements, and the phase space for the phased array antenna is defined by N2 weight vectors.

a. Beam Search Stage 1 (Timing Recovery) Training Sequence

During a first beam search stage (Stage 1), STA1 810 transmits a Stage 1 training sequence (1) that is used for timing recovery estimation and/or automatic gain control (AGC) to STA2 820.

b. Beam Search Stage 2 (STA2 Estimation) Training Sequence

During a second beam search stage (Stage 2), the STA1 810 transmits a Stage 2 training sequence (2) to the STA2 820. The training sequence length is set to N2. During the course of the Stage 2 training sequence (2), the STA2 beamforming vector switches between phase vectors within the same set of weight vectors as in Stage 1, while the STA1 is fixed to the first sector (direction) of the switched array antenna.

c. Beam Search Stages 3, 4. N1+1 (STA2 estimation) training sequences

During beam search stages 3, 4 . . . N1+1, the STA1 810 transmits Stage 3, 4, . . . N1+1 training sequences (4) to the STA2 820. The training sequence lengths are again set to N2. During each of the stages, the STA2 phase vector switches between phase vectors within the same set of weight vectors as in stage 1, while the STA1 is fixed to a second sector, a third sector, . . . , and N1$^{th}$ sector, respectively.

During or after the reception of the estimation sequences, the STA2 820 optimizes the received SNRs or other LQI in other embodiments. The SNR optimization can include estimating SNR values for N1×N2 training sequences received by the STA2 and finding the highest SNR value. This process leads to a set of an optimal receive phase vector and an optimal transmit antenna sector that is determined to yield the highest SNR value among N1×N2 possible combinations of phase vectors and antenna sectors.

d. Stage N1+2, Feedback

After the SNR optimization, the STA2 820 transmits a feedback message (5) to the STA1 810. The feedback message (5) indicates the optimal transmit antenna sector at STA1 that is determined to yield the highest SNR value. Subsequently, the STA1 810 fixes the switched array antenna to the optimal antenna sector and transmits data to the STA2 via the switched array antenna so fixed.

The above-described system and method for an efficient transmit and receive beamforming protocol with heterogeneous directional antennas may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the transmitter 211 or the receiver 212 shown in FIG. 2 includes the computer readable recording medium and can also include a processor, controller, or other computing device.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of training antennas for two devices having heterogeneous antenna configurations in a wireless network, the method comprising:
   generating estimation training sequences by a first device;
   communicating the estimation training sequences between the first device and a second device, the first device including a first antenna and the second device including a second antenna, wherein for a beamforming vector for a first antenna, the first antenna switches between phase vectors within a set of weight vectors for a first estimation training sequence, and for each subsequent estimation training sequence that is communicated, the first antenna switches between phase vectors within said set of weight vectors as in the first estimation training sequence while the second antenna is switched to a different antenna sector within a plurality of antenna sectors;
   tuning at least one of the first antenna and the second antenna with an antenna parameter selected based at least in part on the estimation training sequences,
   wherein the estimation training sequences are based on antenna configuration of the first antenna; and
   exchanging messages between the first device and the second device prior to transmitting the first estimation training sequence indicating antenna type for the first antenna and the second antenna, wherein the antenna type comprises one of a switched array antenna and a phased array antenna.

2. The method of claim 1, wherein the first antenna comprises a phased array antenna and the second antenna comprises a switched array antenna.

3. The method of claim 2, further comprising:
   communicating data messages via at least one of the first antenna and the second antenna.

4. The method of claim 3, wherein exchanging messages comprises exchanging an association request and response messages, wherein the association request and response messages contain data indicative of the antenna type and a number of antenna elements of the antenna at the device where the message is originated.

5. The method of claim 2, wherein the second device determines a link quality indicator (LQI) associated with received estimation training sequences.

6. The method of claim 1, wherein each of the estimation training sequences is used to estimate a link quality indicator (LQI), wherein each LQI includes a signal-to-noise ratios (SNR).

7. The method of claim 1, wherein the selected antenna parameter includes a phase vector for the first antenna that is determined to yield a highest estimated signal-to-noise ratio (SNR) value.

8. The method of claim 1, wherein the selected antenna parameter includes an antenna sector for the second antenna that yields a highest estimated signal-to-noise ratio (SNR) value.

9. The method of claim 1, wherein each of the estimation training sequences includes a pseudo random number (PN) sequence.

10. The method of claim 1, wherein each of the estimation training sequences includes a random sequence.

11. The method of claim 1, wherein the first antenna and the second antenna are different types of directional antennas.

12. The method of claim 11, wherein an estimation training sequence length is set to a number of weight vectors spanning a phase space for the phased array antenna.

13. The method of claim 11, wherein an estimation training sequence length is set to a number of antenna sectors for the switched array antennas.

14. A method of antenna training for two devices having heterogeneous antenna configurations in a wireless network, the method comprising:
  generating a first estimation training sequence by a first device;
  transmitting the first estimation training sequence via a first antenna of the first device to a second antenna of a second device, the first antenna comprising a phased array antenna and the second antenna comprising a switched array antenna, for the first estimation training sequence that is transmitted, for a beamforming vector for the phased array antenna, the phased array antenna switches between phase vectors within a set of weight vectors while the switched array antenna of the second device is fixed to a first antenna sector, and for each subsequent estimation training sequence that is transmitted, for the beamforming vector of the phased array antenna, the phased array antenna switches between phase vectors within said set of weight vectors as in a first training estimation training sequence while the switched array antenna of the second device is fixed to a different antenna sector for each subsequent estimation training sequence; and
  exchanging messages, between the first device and the second device prior to transmitting the first estimation training sequence, indicating antenna type for the first antenna and the second antenna, wherein the antenna type comprises one of a switched array antenna and a phased array antenna,
wherein the first estimation training sequence is based on an antenna configuration of the first antenna.

15. The method of claim 14, further comprising:
  repeating transmitting the subsequent estimation training sequences via the first antenna for a finite number of times, each with a different antenna sector at the second device from a previous transmitted estimation training sequence, wherein the first device comprises a transmitter, and the second device comprises a receiver.

16. The method of claim 15, further comprising:
  receiving, by the transmitter, a feedback message indicative of a phase vector that is selected at the receiver based at least in part on the transmitted estimation training sequences; and
  transmitting data to the receiver via the first antenna at the transmitter tuned with the phase vector that is selected at the receiver.

17. The method of claim 16, wherein exchanging messages comprises exchanging messages between the transmitter and the receiver prior to transmitting the first estimation training sequence, wherein the messages contain data indicating that the second antenna at the receiver is a switched array antenna and that the first antenna at the transmitter is a phased array antenna.

18. The method of claim 16, wherein each of the estimation training sequences is used to estimate a link quality indicator (LQI) at the receiver.

19. The method of claim 18, wherein the LQI includes a signal-to-noise ratio (SNR).

20. The method of claim 18, wherein the selected phase vector is a phase vector that is determined to yield a highest estimated SNR.

21. The method of claim 16, wherein each of the estimation training sequences includes a pseudo random number (PN) sequence.

22. The method of claim 16, wherein the set of weight vectors forms an orthogonal matrix.

23. The method of claim 22, wherein the orthogonal matrix is a Hadamard matrix or a Fourier matrix.

24. The method of claim 16, wherein the subsequent estimation training sequences via the first antenna are transmitted for a finite number of times, each with a different antenna sector at the second device, wherein transmitting subsequent estimation training sequences is repeated until an ending condition is met.

25. The method of claim 24, wherein subsequent estimation training sequences via the first antenna are transmitted for a finite number of times, each with a different antenna sector at the second device, wherein transmitting subsequent estimation training sequences is repeated until reaching a pre-determined number of iterations.

26. The method of claim 16, further comprising transmitting a timing recovery training sequence prior to transmitting the first estimation training sequence, wherein the timing recovery sequence is intended for one or both of automatic gain control (AGC) and timing recovery estimation.

27. A method of antenna training for two devices having heterogeneous antenna configurations in a wireless network, the method comprising:
  generating a plurality of estimation training sequences by a transmitter based on an antenna configuration of a first antenna of the transmitter;
  transmitting the plurality of estimation training sequences via the first antenna, wherein for a first estimation training sequence that is transmitted, for a beamforming vector for the first antenna, the first antenna switches between phase vectors within a set of weight vectors while a second antenna at a receiver is fixed to a first antenna sector, and for each subsequent estimation training sequence transmitted, for the beamforming vector for the first antenna, the first antenna switches between phase vectors within said set of weight vectors as in the first estimation training sequence that was transmitted, while the second antenna at the receiver is fixed to a different antenna sector for each subsequent estimation training sequence; and
  exchanging messages, between the transmitter and the receiver prior to transmitting the first estimation training sequence, indicating antenna type for the first antenna and the second antenna, wherein the antenna type comprises one of a switched array antenna and a phased array antenna.

28. The method of claim 27, wherein the first antenna comprises a phased array antenna and the second antenna comprises a switched array antenna.

29. The method of claim 28, further comprising:
transmitting data via the first antenna tuned to a phase vector that is selected based at least in part on the transmitted estimation training sequences.

30. A method of antenna training for two devices having heterogeneous antenna configurations in a wireless network, the method comprising:
generating a first estimation training sequence by a transmitter based on an antenna configuration of a first antenna of the transmitter;
transmitting the first estimation training sequence via the first antenna, wherein the first antenna comprises a switched array antenna, wherein for the first estimation training sequence that is transmitted, for a beamforming vector of a second antenna of a receiver, the second antenna switches between phase vectors within a set of weight vectors, wherein the second antenna comprises a phased array antenna, wherein for each subsequent estimation training sequence transmitted, for the beamforming vector of the second antenna of the receiver, the phased array antenna switches between phase vectors within said set of weight vectors as the first estimation training sequence while the switched array antenna is fixed to a different antenna sector for each subsequent estimation training sequence; and
exchanging a message between the transmitter and the receiver prior to transmitting the first estimation training sequence, wherein the message contains data indicating that the antenna at the receiver is a phased array antenna and the antenna at the transmitter is a switched array antenna.

31. The method of claim 30, further comprising:
receiving, at the transmitter, a feedback message indicative of an antenna sector that is selected at the receiver based at least in part on the transmitted estimation training sequences; and
transmitting data to the receiver via the switched array antenna at the transmitter fixed to the antenna sector that is selected at the receiver.

32. The method of claim 31, wherein the estimation training sequences are used to estimate signal-to-noise ratios (SNRs) at the receiver.

33. The method of claim 32, wherein the selected antenna sector is an antenna sector that is determined to yield a highest estimated SNR.

34. The method of claim 31, wherein each of the estimation training sequences includes a pseudo random number (PN) sequence.

35. The method of claim 31, wherein the set of weight vectors forms an orthogonal matrix.

36. A method of antenna training for two devices having heterogeneous antenna configurations in a wireless network, the method comprising:
generating a plurality of estimation training sequences via a first antenna based on a configuration of the first antenna;
transmitting the plurality of estimation training sequences via the first antenna, wherein the first estimation training sequence that is transmitted, for a beamforming vector of a second antenna at a receiver, the second antenna switches between phase vectors within a set of weight vectors, wherein for each subsequent estimation training sequence transmitted, a beamforming vector of the second antenna at the receiver switches between phase vectors within said set of weight vectors as in the first estimation training sequence while the first antenna is fixed to a different antenna sector for each subsequent estimation training sequence; and
exchanging a message, between a transmitter and the receiver, prior to transmitting the first estimation training sequence, wherein the message contains data indicating antenna type for the first antenna and the second antenna, wherein the antenna type comprises one of a switched array antenna and a phased array antenna.

37. The method of claim 36, wherein the first antenna comprises a switched array antenna and the second antenna comprises a phase array antenna.

38. The method of claim 37, further comprising:
transmitting data via the second antenna tuned to a phase vector that is selected based at least in part on the transmitted estimation training sequences.

39. A system for training antennas for two devices having heterogeneous antenna configurations in a wireless network, the system comprising:
a phased array antenna; and
a processor in data communication with the phased array antenna and configured for:
generating a first estimation training sequence based on configuration of the phased array antenna;
transmitting the first estimation training sequence via the phased array antenna, wherein for the first estimation training sequence that is transmitted, for a beamforming vector for the phased array antenna, the phased array antenna switches between phase vectors within a set of weight vectors while a switched array antenna at a second device is fixed to a first antenna sector, and for each subsequent estimation training sequence transmitted, for a beamforming vector of the phased array antenna, the phased array antenna switches between phase vectors within said set of weight vectors as in the first estimation training sequence while the switched array antenna at the second device is fixed to a different antenna sector for each subsequent estimation training sequence; and
exchanging a message prior to the transmission of the first estimation training sequence, wherein the message contains data indicating that the antenna at the receiver is the switched array antenna and that the antenna at a transmitter is the phased array antenna.

40. The system of claim 39, wherein the processor further configured for:
repeating transmitting the subsequent estimation training sequences via the phased array antenna for a finite number of times.

41. The system of claim 40, wherein the processor is further configured for:
receiving a feedback message indicative of a phase vector that is selected based at least in part on the transmitted estimation training sequences, and
transmitting data to the receiver via the phased array antenna tuned with the selected phase vector.

42. The system of claim 39, wherein each of the estimation training sequences includes a pseudo random number (PN) sequence.

43. A system for training antenna for two devices having heterogeneous antenna configurations in a wireless network, the system comprising:
a switched array antenna; and
a processor in data communication with the switched array antenna and configured for:
generating a first estimation training sequence via the switched array antenna based on a configuration of the switched array antenna;

transmitting the first estimation training sequence via the switched array antenna, wherein for the first estimation training sequence that is transmitted, for a beamforming vector for a phased array antenna at a receiver, the phased array antenna switches between phase vectors within a set of weight vectors while the switched array antenna at a receiver is fixed to a first antenna sector, and for subsequent estimation training sequences transmitted, for a beamforming vector of the phased array antenna at the receiver, the phased array antenna switches between phase vectors within said set of weight vectors as in the first estimation training sequence while the switched array antenna is fixed to a different antenna sector for each subsequent estimation training sequence; and exchanging a message prior to the transmission of the first estimation training sequence, wherein the message contains data indicating that the antenna at the receiver is the phased array antenna and that the antenna at the transmitter is the switched array antenna.

44. The system of claim 43, wherein the processor is further configured for:

repeating transmitting subsequent estimation training sequences via the switched array antenna for a finite number of times.

45. The system of claim 44, wherein the processor is further configured for:

receiving a feedback message indicative of an antenna sector that is selected based at least in part on the estimation training sequences, and transmitting data to the receiver via the switched array antenna fixed to the selected antenna sector.

46. The system of claim 45, wherein each of the estimation training sequences includes a pseudo random number (PN) sequence.

47. A method of training antennas for two devices having heterogeneous antenna configurations in a wireless network, the method comprising:

generating one or more estimation training sequences by a first device;

communicating the one or more estimation training sequences between the first device and a second device, the first device including a first antenna and the second device including a second antenna, wherein for a beamforming vector for the first antenna, the first antenna switches between phase vectors within a set of weight vectors for a first estimation training sequence communicated, wherein for each subsequent estimation training sequence communicated, for the beamforming vector of the first antenna, the first antenna switches between phase vectors within said set of weight vectors as in the first estimation training sequence while the second antenna is switched to a different antenna sector within a plurality of antenna sectors for each different estimation training sequence, wherein the first antenna comprises a phased array antenna and the second antenna comprises a switched array antenna;

tuning at least one of the first antenna and the second antenna with an antenna parameter selected based at least in part on the one or more estimation training sequences, wherein the one or more estimation training sequences are based on an antenna configuration of the first antenna; and exchanging messages between the first device and the second device prior to transmitting the first estimation training sequence indicating antenna type for the first antenna and the second antenna, wherein the antenna type comprises one of a switched array antenna and a phased array antenna.

* * * * *